United States Patent
Tsukamoto et al.

(10) Patent No.: US 8,375,920 B2
(45) Date of Patent: Feb. 19, 2013

(54) APPARATUS TO DETERMINE CYLINDER DEACTIVATION STATE

(75) Inventors: Toshinori Tsukamoto, Wako (JP); Naoki Oie, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 201 days.

(21) Appl. No.: 12/639,389

(22) Filed: Dec. 16, 2009

(65) Prior Publication Data
US 2010/0154738 A1  Jun. 24, 2010

(30) Foreign Application Priority Data
Dec. 24, 2008 (JP) .................. 2008-328320

(51) Int. Cl.
*F02D 13/06* (2006.01)
*G06F 19/00* (2006.01)
*G06F 17/00* (2006.01)

(52) U.S. Cl. ............... 123/198 F; 701/114; 702/185
(58) Field of Classification Search .............. 701/114, 701/115, 101, 112, 111, 103; 123/339.17, 123/339.19, 339.22, 179.16, 192.1, 198 F, 123/350, 572; 903/902; 702/185
See application file for complete search history.

(56) References Cited

U.S. PATENT DOCUMENTS

| | | | |
|---|---|---|---|
| 6,820,597 B1 * | 11/2004 | Cullen et al. | 123/520 |
| 6,978,204 B2 * | 12/2005 | Surnilla et al. | 701/103 |
| 2002/0189575 A1 * | 12/2002 | Rayl et al. | 123/198 F |
| 2004/0094133 A1 * | 5/2004 | Lingenhult et al. | 123/519 |
| 2009/0132144 A1 * | 5/2009 | Shinozaki et al. | 701/102 |

FOREIGN PATENT DOCUMENTS

| | | |
|---|---|---|
| JP | 06-146937 | 5/1994 |
| JP | 2003-083148 | 3/2003 |
| JP | 2005-139962 | 6/2005 |
| JP | 2006-052684 A | 2/2006 |
| JP | 2006-336566 A | 12/2006 |

OTHER PUBLICATIONS

Japanese Office Action application No. 2008-328320 dated Oct. 26, 2010.

* cited by examiner

*Primary Examiner* — Noah Kamen
(74) *Attorney, Agent, or Firm* — Squire Sanders (US) LLP

(57) ABSTRACT

An apparatus determines a cylinder deactivation state of an internal combustion engine capable of deactivating one or more cylinders among a plurality of cylinders in accordance with an instruction from a program-controlled electronic control unit (ECU). The apparatus includes detection means to output a signal corresponding to an intake air amount into the internal combustion engine. The ECU includes Fourier transformation means to perform Fourier transformation on the signal from the detection means at plural fundamental frequencies, and determines the cylinder deactivation state with spectrums obtained from the Fourier transformation means based on predetermined relationship between the spectrums of Fourier transformation at the plural fundamental frequencies and the cylinder deactivation state of the internal combustion engine. The ECU distinguishes a deactivated cylinder with a phase obtained from the Fourier transformation means.

12 Claims, 12 Drawing Sheets

APPARATUS TO DETERMINE CYLINDER DEACTIVATION STATE

BACKGROUND OF THE INVENTION

1. Field of the Invention

The present invention relates to an apparatus configured to determine a cylinder deactivation state for an internal combustion engine having a mechanism that is configured to perform cylinder deactivation control to deactivate a part of plural cylinders.

2. Description of the Related Art

There has been an internal combustion engine including a cylinder deactivation mechanism that deactivates operation of a part of plural cylinders. In such an internal combustion engine, it is possible to switch between all cylinder operation for operating all of the plural cylinders and cylinder deactivation operation for deactivating a part of cylinders in accordance with operational conditions.

Japanese Patent Application Laid-open (JP-A) No. 6-146937 discloses a method for detecting failure of the switching between the all cylinder operation and the cylinder deactivation operation. According to this method, the switching failure is detected by comparing intake manifold pressure at the all cylinder operation estimated based on detected engine revolution speed and throttle valve opening with intake manifold pressure actually detected by a sensor arranged at an intake manifold.

Further, JP-A No. 2005-139962 discloses the following method. That is, a detected intake air amount and a set value based on revolution speed of an internal combustion engine are compared after an instruction to start cylinder deactivation control is outputted to the internal combustion engine during deceleration operation of a vehicle. Then, failure occurrence in the cylinder deactivation control is determined when the detected intake air amount is equal to or larger than a threshold value. This method utilizes generation of large difference between the intake air amounts at the all cylinder operation and at the cylinder deactivation operation during deceleration.

Furthermore, JP-A No. 2003-83148 discloses a method to determine apparatus failure by monitoring oil pressure with an oil pressure detection sensor which is provided at a downstream side of an oil passage switching device to switch between activation and deactivation of an intake valve and an exhaust valve of a cylinder in an engine which deactivates a part of cylinders during deceleration.

The failure determination method of a cylinder deactivation mechanism in the related art determines failure of the cylinder deactivation mechanism as a whole, so that identification of an activated cylinder and a deactivated cylinder is not done. In order to monitor whether or not the cylinder deactivation mechanism is appropriately operated in accordance with instructions from an electronic control unit, it is desired to determine which cylinder is activated or deactivated.

Therefore, a method for determining a cylinder deactivation state has been needed for an engine having a cylinder deactivation mechanism.

SUMMARY OF THE INVENTION

The present invention provides an apparatus for determining a cylinder deactivation state of an internal combustion engine that is configured to deactivate one or more cylinders among a plurality of cylinders in accordance with an instruction from a program-controlled electronic control unit (ECU).

The apparatus includes detection means that produces a signal representing an intake air amount fed into the internal combustion engine. The electronic control unit includes Fourier transformation means to perform Fourier transformation on the signal from the detection means relative to a plurality of fundamental frequencies, and determines the cylinder deactivation state from spectrums obtained from the Fourier transformation means in accordance with predetermined relationship between the spectrums of Fourier transformation at the plurality of fundamental frequencies and the cylinder deactivation state of the internal combustion engine.

According to an embodiment of the present invention, the electronic control unit further identifies a deactivated cylinder in accordance with a phase obtained from the Fourier transformation means.

Further, according to another embodiment, the plurality of fundamental frequencies include a first fundamental frequency corresponding to 720 degrees of crank angle, one cycle of the internal combustion engine, and other fundamental frequencies larger than the first fundamental frequency and each corresponding to frequency of the signal representing intake air amount.

Further, according to another embodiment, the electronic control unit includes means that provides a threshold value for determining the cylinder deactivation state based on predetermined relationship between spectrums obtained from the Fourier transformation means at the plurality of fundamental frequencies and the cylinder deactivation state of the internal combustion engine. The threshold value is provided in accordance with revolution speed and/or load of the internal combustion engine.

Further, according to another embodiment, a deactivated cylinder is identified based on phase information obtained from Fourier transformation.

Furthermore, according to another embodiment, it is determined whether or not the determined cylinder deactivation state matches with an instruction from the electronic control unit, and when the determination is normal, the electronic control unit performs failure determination of hydraulic sensor means provided in a hydraulic circuit for hydraulically activating a cylinder deactivation mechanism.

DESCRIPTION OF THE EMBODIMENTS

Figure 1:
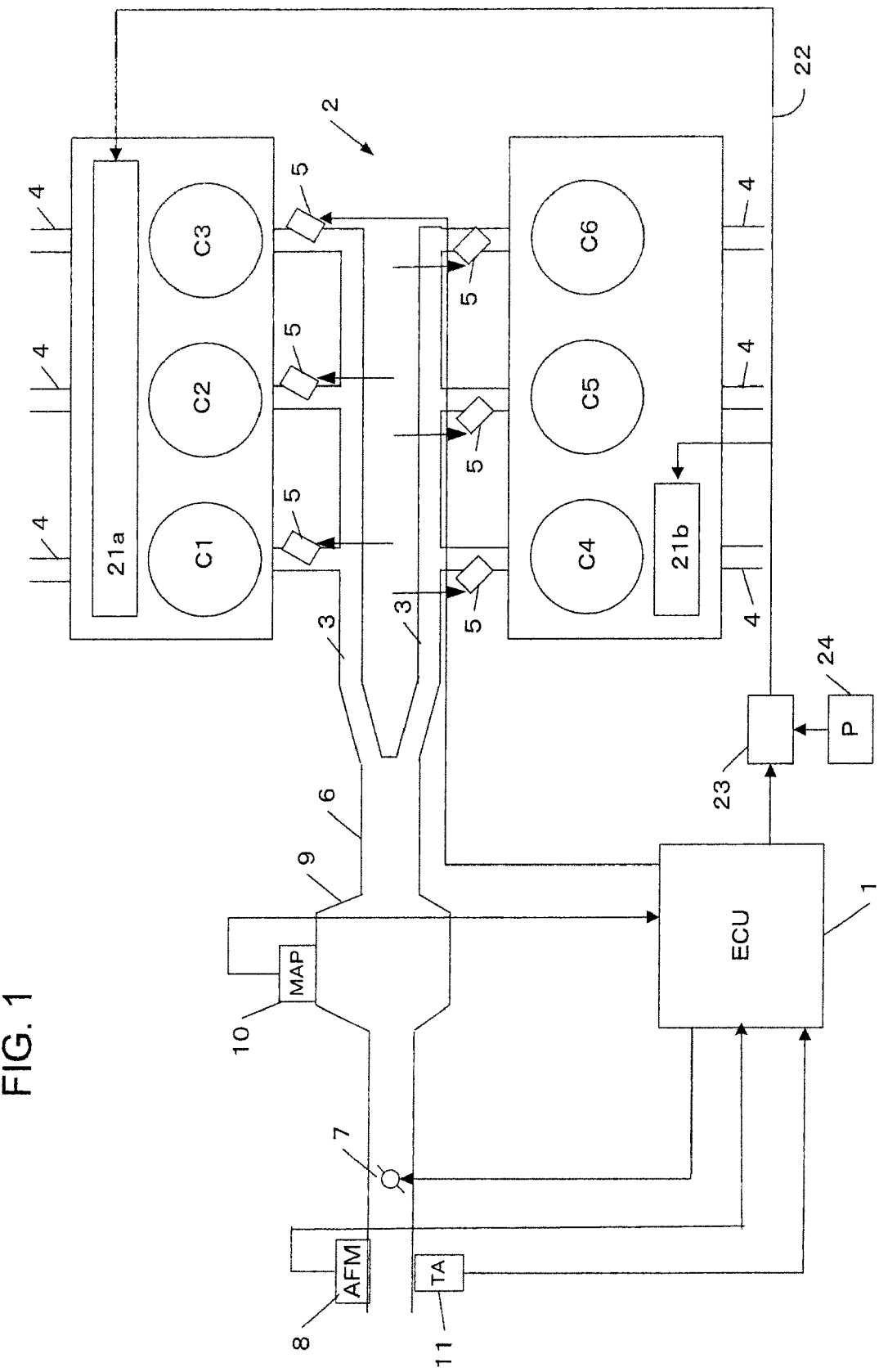
FIG. 1 is a block diagram which illustrates the configuration of an engine according to an embodiment of the present invention.

Next, embodiments of the present invention will be described with reference to the drawings. FIG. 1 is a view of the whole configuration of an internal combustion engine and a control apparatus thereof according to an embodiment of the present invention.

An electronic control unit (hereinafter, called the ECU) 1 is a computer having a central processing unit (CPU) and a memory. The memory is capable of storing computer programs for performing a variety of vehicle controls and necessary data (including maps) for executing the programs. The ECU 1 performs arithmetic in accordance with the programs and data stored at the memory and generates control signals for controlling respective parts of a vehicle while receiving signals from respective parts of the vehicle.

An engine 2 is a variable cylinder number engine having a first bank of three cylinders C1 to C3 and a second bank of three cylinders C4 to C6. An intake pipe 3 and an exhaust pipe 4 are connected to each cylinder. A fuel injector 5 is provided to the intake pipe 3 of each cylinder. The fuel injector 5 injects fuel by means of a fuel pump (not illustrated). The timing and amount of injecting fuel are varied in accordance with control signals from the ECU 1.

A throttle valve 7 is provided to an intake passage 6 at the upstream side of a collecting portion of the intake pipes 3 of the respective cylinders. Opening of the throttle valve 7 is controlled in accordance with a control signal from the ECU 1. By controlling the opening of the throttle valve 7, an air amount sucked into the engine 2 can be controlled.

An air flow sensor or air flow-meter (AFM) 8 for detecting an amount of air flowing through the intake passage 6 and an intake air temperature (TA) sensor 11 for detecting temperature of the air flowing through the intake passage 6 are arranged at the upstream side of the throttle valve 7. Detected values of the air flow sensor 8 and the TA sensor 11 are transmitted to the ECU 1. The air passed through the throttle valve 7 is sucked into each intake pipe 3 via a surge tank 9. A MAP sensor 10 for detecting the pressure (the absolute pressure) at the intake passage 6 is provided at the serge tank 9. A detected value of the MAP sensor 10 is transmitted to the ECU 1.

A cylinder deactivation mechanism 21a for switching the cylinders C1 through C3 between activation and deactivation is provided at the first bank. A cylinder deactivation mechanism 21b for switching the cylinder C4 between activation and deactivation is provided at the second bank. An oil passage 22 for the cylinder deactivation is connected to the first and second cylinder deactivation mechanisms 21a, 21b. The oil passage 22 is connected to an oil pump 24 via a control valve 23.

The cylinder deactivation mechanisms 21a, 21b are mechanisms of an oil-pressure-operated type to utilize lubricant oil discharged from the oil pump 24 which is driven by power of a crank shaft as operational oil. Details thereof are described in JP-A Nos. 2003-83148 and 2005-105869. In brief, a connecting pin is slid by the action of high pressure operational oil so that the connection of a cam-lift rocker arm with a rocker arm for exhaust vale operation and a rocker arm for intake valve operation is released. Thus, the exhaust valve and intake valve are deactivated. Simultaneously, fuel injection into the cylinder is stopped.

In the state that low pressure operational oil is supplied to the deactivation mechanism, the connecting pin is slid by the action of a spring, so that the cam-lift rocker arm is connected with the rocker arm for exhaust vale operation and the rocker arm for intake valve operation. Thus, the exhaust valve and intake valve are activated. Simultaneously, fuel injection into the cylinder is resumed.

A control valve 23 switches a desired cylinder between activation and deactivation by switching between high pressure and low pressure of the oil for activating the first and second cylinder deactivation mechanisms 21a, 21b in accordance with a control signal from the ECU 1. In accordance with input signals from the abovementioned various sensors, the ECU 1 generates control signals for controlling the throttle valve 7, the fuel injector 5 and the control valve 23 while detecting an operation state of the engine 2 in accordance with on the programs and data (including maps) stored at the memory.

Figure 2:
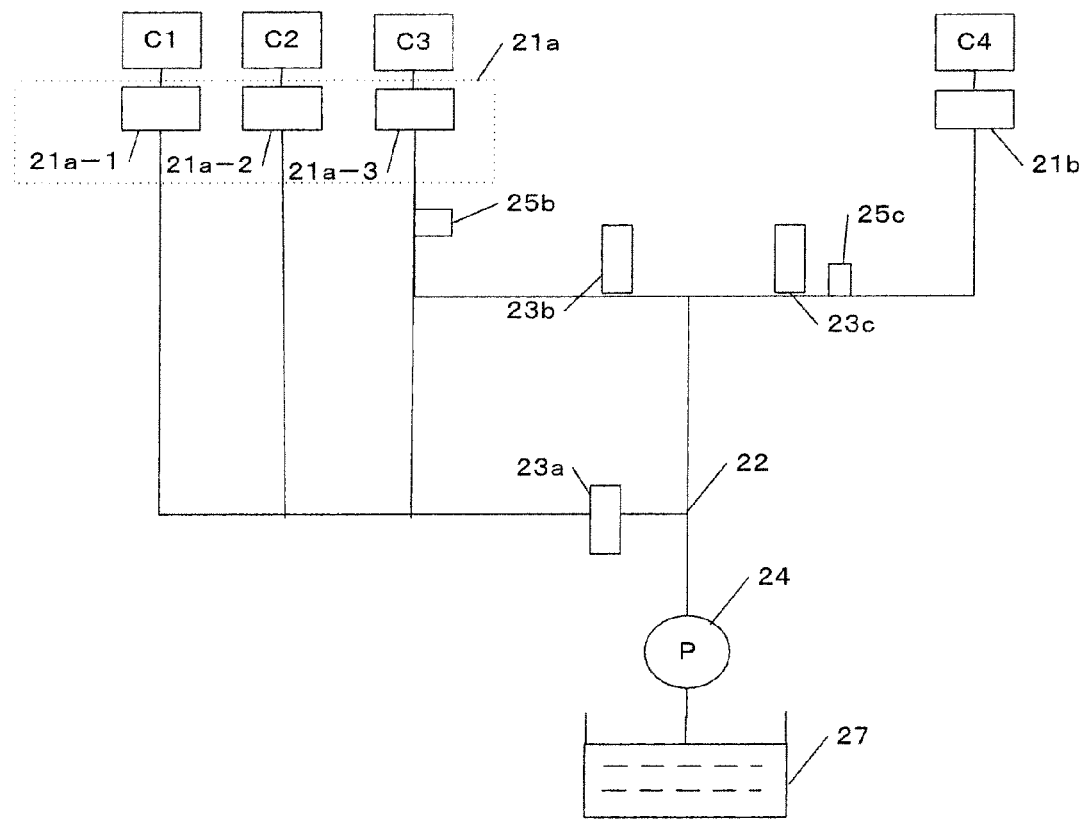
FIG. 2 is a view which illustrates a hydraulic circuit for a cylinder deactivation mechanism according to an embodiment.

Here, the mechanism for variably changing the number of functioning cylinders will be described more specifically with reference to FIG. 2. The oil passage 22 for the cylinder deactivation is connected to the cylinders C1 through C3 of the first bank via respective cylinder deactivation mechanisms 21a-1 to 21a-3 (collectively indicated as the cylinder deactivation mechanism 21a in FIG. 1). The oil passage 22 is connected to the cylinder C4 of the second bank via the cylinder deactivation mechanism 21b. The deactivation mechanism is not provided for the cylinders C5, C6 of the second bank and the oil passage 22 is not connected thereto accordingly. The cylinders C5, C6 are to be operated without being deactivated.

The oil passage 22 is connected to an oil tank 27 via the oil pump 24. The oil passage 22 is provided with three control valves 23a through 23c (collectively indicated as the control valve 23 in FIG. 1). The first control valve 23a is for switching between high pressure and low pressure the pressure of oil for actuating the deactivation mechanisms 21a-1, 21a-2, 21a-3 of the cylinders C1 to C3 of the first bank. The second control valve 23b is for switching between high pressure and low pressure the pressure of oil for actuating the deactivation mechanism 21a-3 of the cylinder C3 of the first bank. The third control valve 23c is for switching between high pressure and low pressure of the pressure of oil for actuating the deactivation mechanism 21b of the cylinder C4 of the second bank. These control valves are controlled by the control signals from the ECU 1.

The present embodiment has three operation modes. The first mode is all cylinder operation in which all of the intake valves and exhaust valves of the cylinders C1 to C6 are activated. The second mode is two cylinder deactivation operation in which the intake valves and exhaust valves of two cylinders, the cylinder C3 of the first bank and the cylinder C4 of the second bank, are deactivated. The third mode is three cylinder deactivation operation in which the intake valves and exhaust valves of three cylinders, the cylinders C1 to C3 of the first bank, are deactivated.

When the all cylinder operation of the first mode is performed, the pressure of oil is low on all of the deactivation mechanisms as controlled by the control valves 23a to 23c such that the deactivation mechanisms 21a-1 to 21a-3 and 21b are in a non-operational state.

When the two cylinder deactivation operation of the second mode is performed, the control valves 23b, 23c raise the pressure of oil for the deactivation mechanisms 21a-3, 21b to bring them into an operational state. The pressure of oil for the remaining deactivation mechanisms 21a-1, 21a-2 is maintained low as controlled by the control valve 23a to keep them in non-operational state.

When the three cylinder deactivation operation of the third mode is performed, the pressure of oil the deactivation mechanisms 21a-1 to 21a-3 of the first bank is high as controlled by the control valves 23a, 23b such that they are in operational state. Simultaneously, the pressure of oil for the deactivation mechanism 21b is low as controlled by the control valve 23c such that it is in non-operational state.

A hydraulic sensor 25b for detecting oil pressure acting on the deactivation mechanism 21a-3 via the second control valve 23b is provided between the second control valve 23b and the deactivation mechanism 21a-3 of the cylinder C3. A hydraulic sensor 25c for detecting oil pressure acting on the deactivation mechanism 21b is provided between the third control valve 23c and the deactivation mechanism 21b of the cylinder C4. It is also possible that all of the deactivation mechanisms are respectively provided with a hydraulic sensor. Detected signals of these hydraulic sensors are transmitted to the ECU 1.

Figure 3:
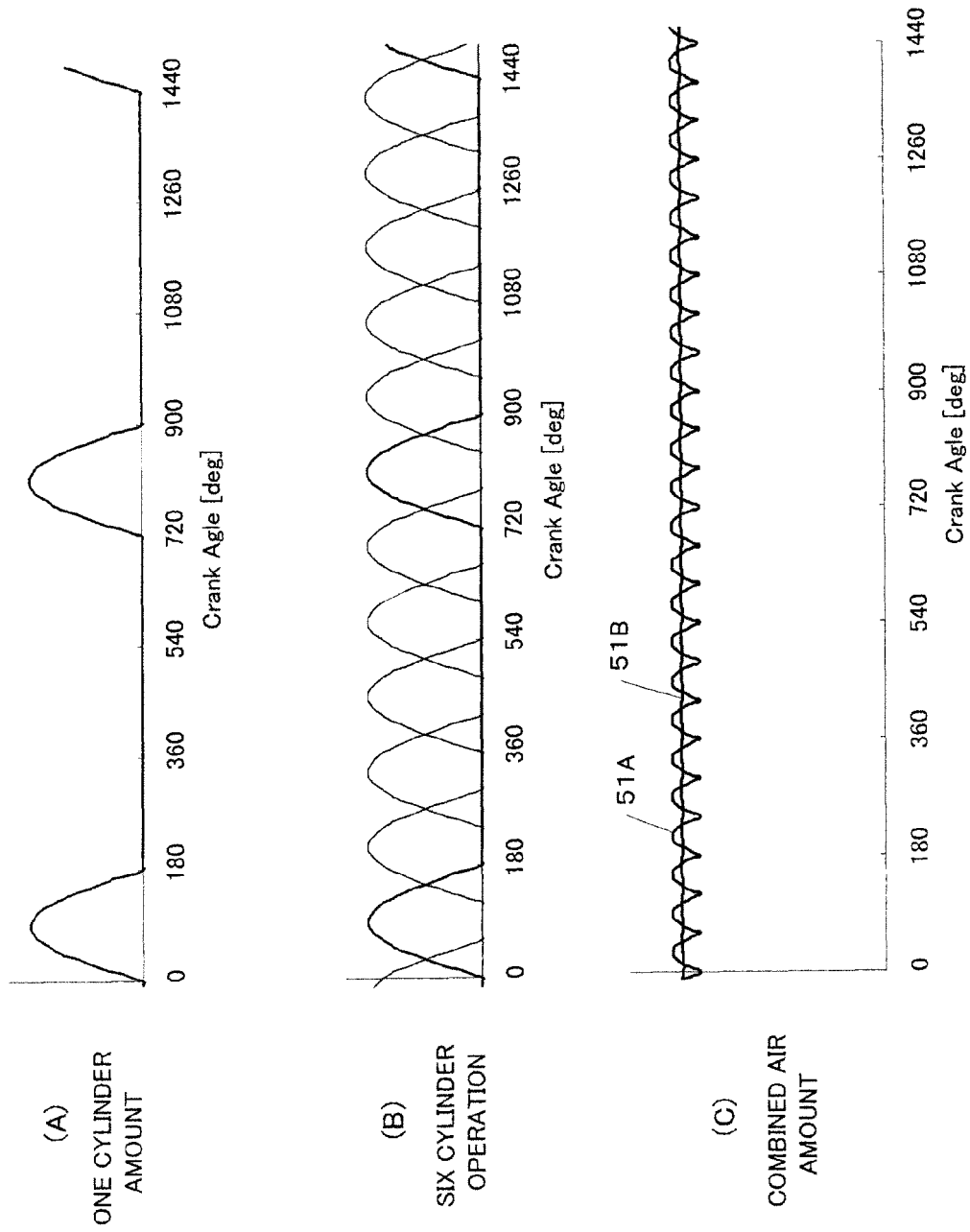
FIGS. 3A to 3C are graphs which illustrate waveforms corresponding to air amounts sucked into cylinders in a six-cylinder operation mode.

FIGS. 3A to 3C illustrate the relationship between the intake air flow Gair (g/sec) and the rotation angle of a crank shaft of the engine. In a four-stroke engine where one cycle of combustion comprised four stroke movement of a piston, namely, intake stroke, compression stroke, combustion stroke and exhaust stroke, one cycle corresponds to 720 degrees since the crank shaft rotates twice in one cycle of combustion. FIG. 3A illustrates the air intake amount of one cylinder. The intake stroke appears every 720 degrees and air is sucked by downward movement of the piston. FIG. 3B illustrates the individual air amounts sucked by respective six cylinders. The cylinders are operated in the order of C6, C1, C4, C2, C5 and C3 as illustrated by the numerals in FIG. 1. FIG. 3C illustrates a waveform of the combined intake air amount by the six cylinders. When the waveforms in FIG. 3B are simply added, the resultant waveform is uneven pulsation as illustrated by a pulsating waveform 51A in FIG. 3C. However, the waveform detected by the air flow sensor 8 is an almost flat direct-current waveform 51B under the influence of transmitting delay due to capacity of the intake pipe and the like. As described above, the waveform 51B is close to a direct-current waveform and can be regarded as a waveform of a 120 degree period-cycle.

Figure 4:
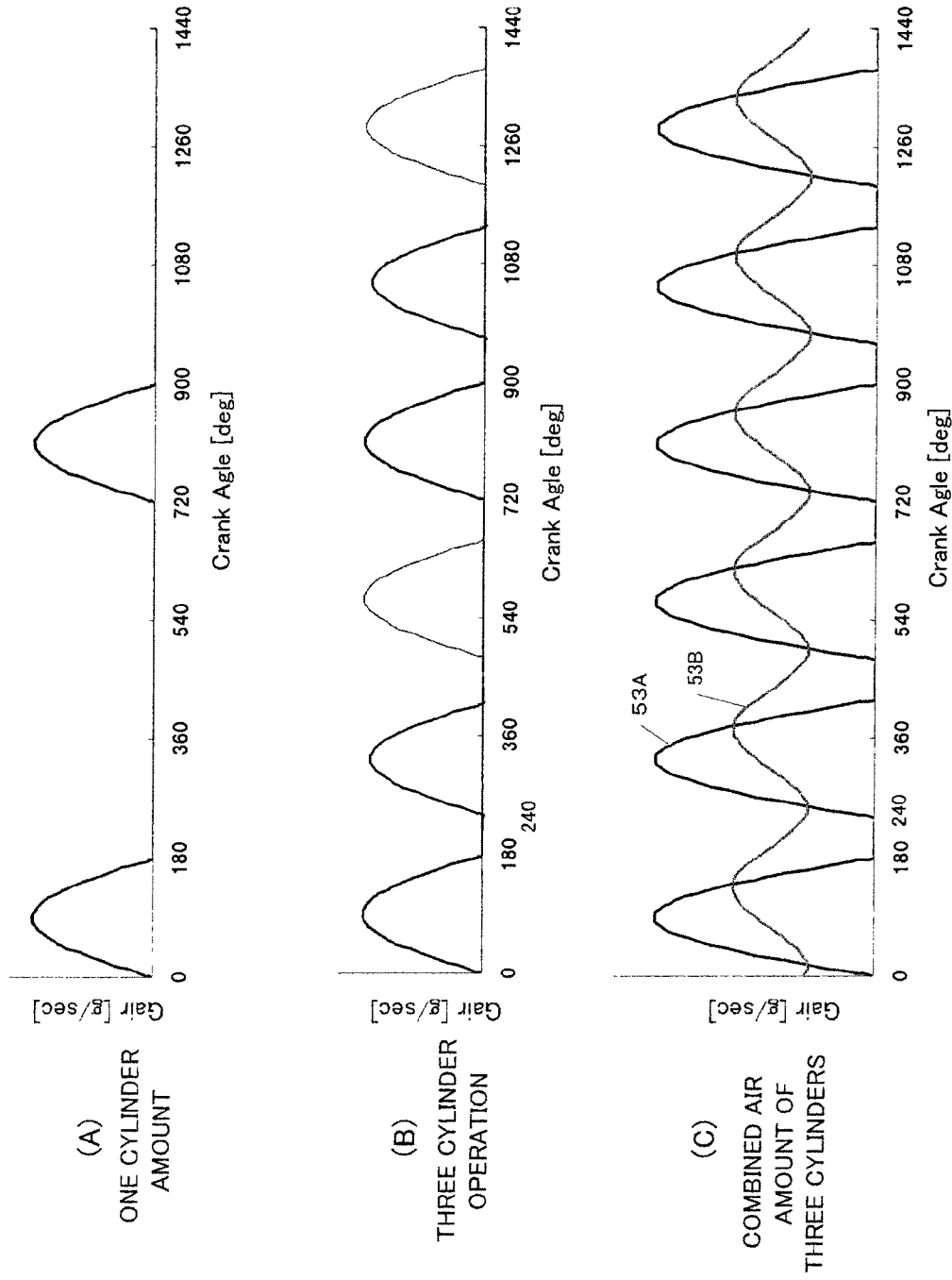
FIGS. 4A to 4C are graphs which illustrate waveforms corresponding to air amounts sucked into cylinders in a three-cylinder operation mode.

FIGS. 4A to 4C illustrate the intake air amount in the three-cylinder operation mode in which the cylinders C6, C4, C5 of the second bank are operated in this order while the cylinders C1, C2, C3 of the first bank are deactivated. FIG. 4A illustrates the relationship between the intake air amount and the crank angle of the cylinder C6. FIG. 4B illustrates the individual intake air amounts of the three cylinders. As is apparent from FIG. 4B, the waveform of the three-cylinder operation mode has a cycle of 240 degrees. FIG. 4C illustrates a waveform 53A of the individual air amounts sucked by the respective three cylinders and a smooth waveform 53B of the intake air amount which is actually detected by the air flow sensor 8. In this case, the waveform detected by the air flow sensor 8 also forms a smooth waveform of the cycle of 240 degrees under the influence of transmitting delay due to the capacity of the intake pipe and the like.

Then, not illustrated in the drawings, the waveform of the intake air amount of the four-cylinder operation mode has a cycle of 360 degrees. A six-cylinder engine is operated in the order of cylinders of 1-4-2-5-3-6. In the four-cylinder operation mode, the fourth cylinder and the third cylinder are deactivated so as to be operated in so-called two-combustion and one-deactivation. In FIG. 3B, the waveform rising at zero degree is the waveform of the sixth cylinder. The next crest corresponds to the first cylinder and the third crest corresponds to the fourth cylinder. In the four-cylinder operation mode, the fourth cylinder is deactivated, and then, the next crest rising at 360 degrees is of the second cylinder. Thus, the cycle of the waveform is to be 360 degrees.

Figure 5:
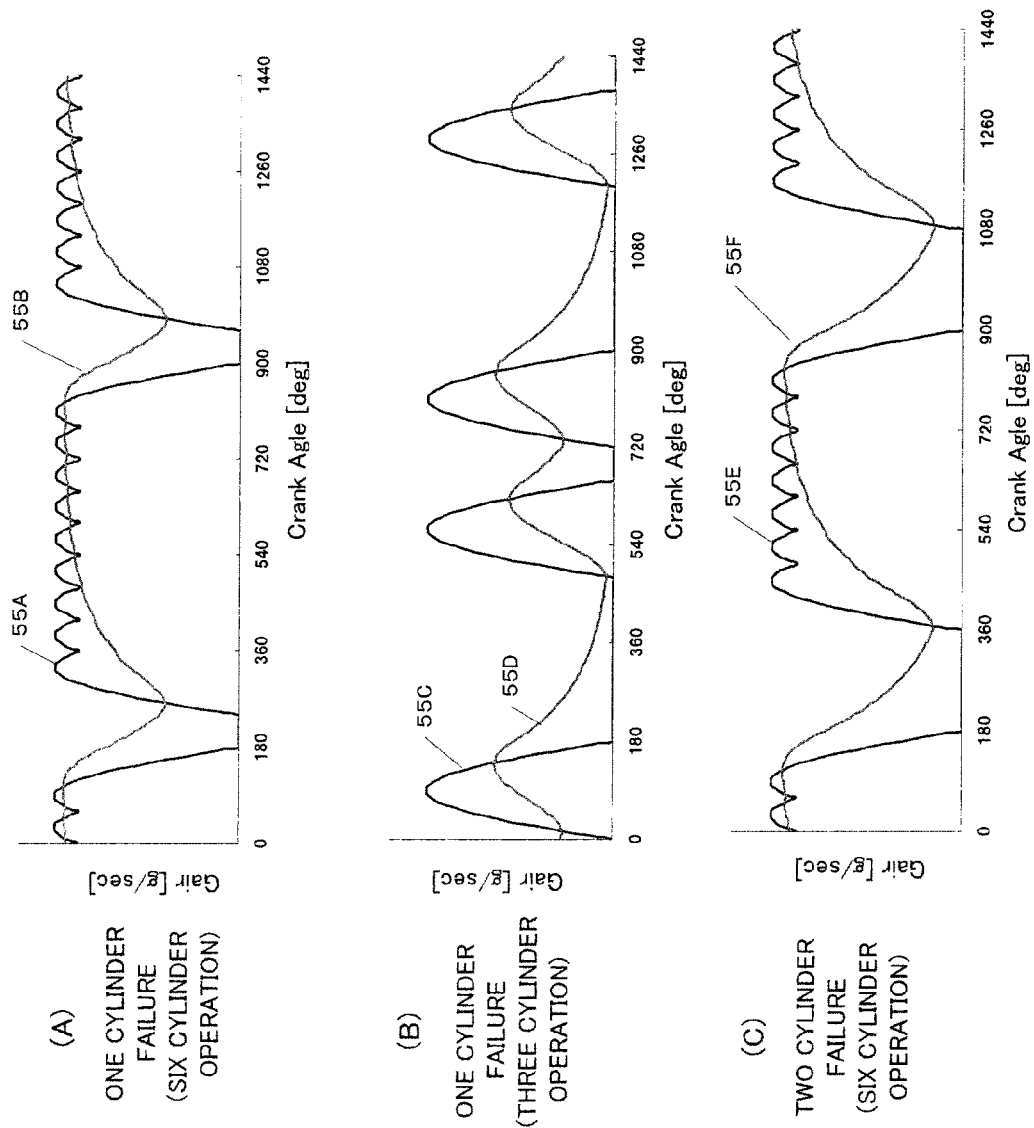
FIGS. 5A to 5C are graphs which illustrate waveforms of intake air amounts with cylinder deactivation failure at a cylinder or cylinders.

FIG. 5A illustrates waveforms of the intake air amount in a state that one cylinder is deactivated due to an error occurring in the six-cylinder operation mode. There arises missing of one cylinder amount from the waveform 55A of the combined intake air amount of the respective cylinders. The waveform 55B of the intake air amount which is actually detected by the air flow sensor 8 is smooth under the influence of transmitting delay due to the intake pipe capacity. Here, the waveform 55B is intrinsic to a state of one cylinder failure in the six-cylinder operation mode.

FIG. 5B illustrates waveforms of the intake air amount in a state that one cylinder is deactivated due to an error occurring in the three-cylinder operation mode. As can be seen from a waveform 55C in FIG. 5B, only two cylinders sucks air within the rotation of 720 degrees of the crank shaft. In this case, the waveform of the intake air amount detected by the air flow sensor 8 is to be as a waveform 55D. The waveform 55D is intrinsic to a state of one cylinder failure as well in the three cylinder operation.

FIG. 5C illustrates waveforms of the intake air amount in a state that two serial cylinders are deactivated due to an error occurring in the six-cylinder operation mode. A waveform 55E is of the combined air amount sucked by respective operating cylinders. The waveform of the intake air amount detected by the air flow sensor 8 is to be as a waveform 55F. The waveform 55F is intrinsic to a state of failure of two serial cylinders as well in the six-cylinder operation mode.

Figure 6:
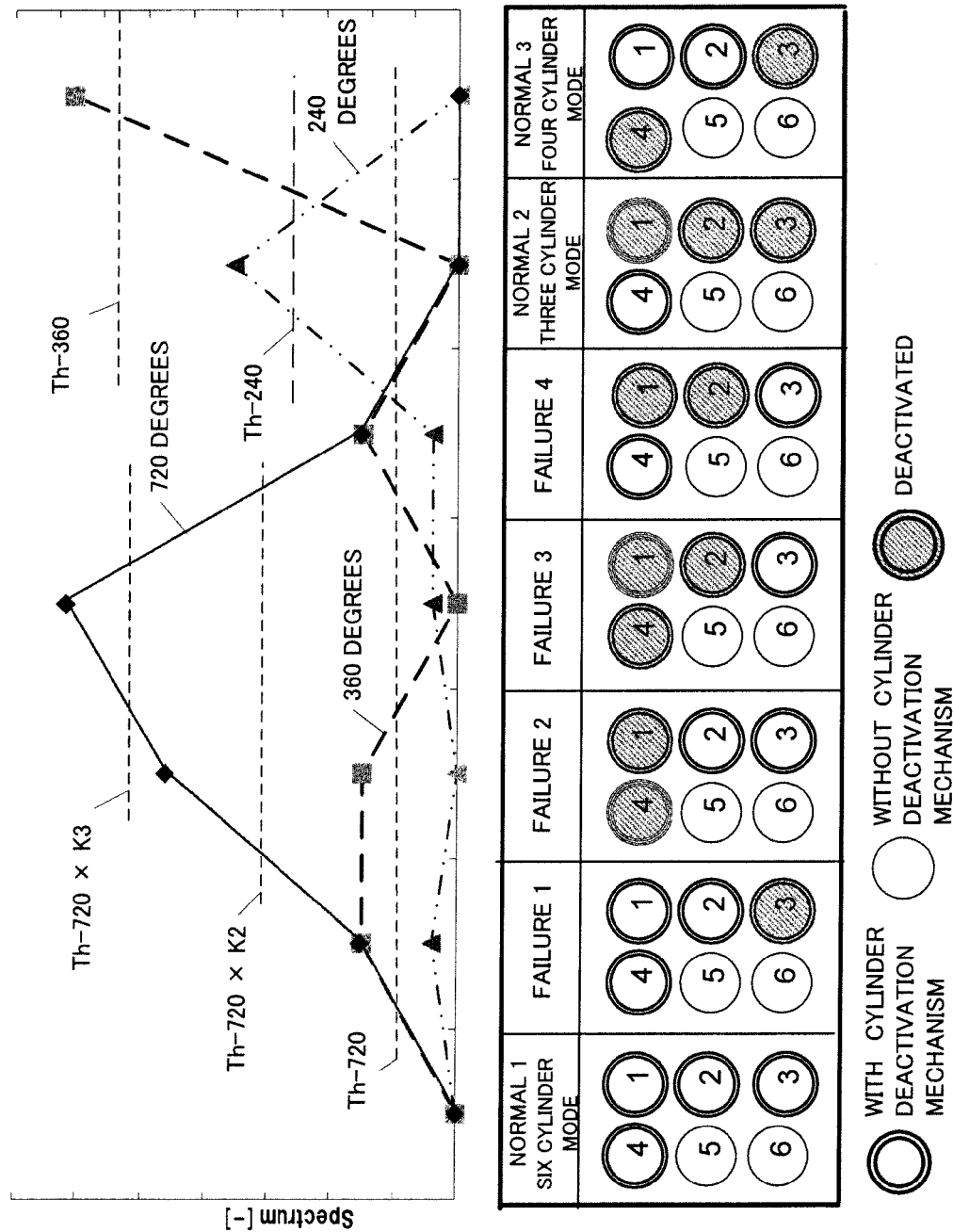
FIG. 6 is a view which illustrates correspondence between cylinder deactivation states and spectrums obtained from Fourier transformation performed on waveforms respectively indicating the intake air amounts at cycles of 720 degrees, 360 degrees and 240 degrees.

FIG. 6 illustrates correspondence between cylinder operation states and spectrums obtained from Fourier transformation performed on waveforms of the intake air amount detected by the air flow sensor respectively at the cycle of 720 degrees corresponding to the six-cylinder operation mode, the cycle of 360 degrees corresponding to the four-cylinder operation mode and the cycles of 240 degrees corresponding to the three-cylinder operation mode. In FIG. 6, a plurality of spectrums at the same cycle are connected with lines. However, the lines are simply for the sake of convenience and have no particular meaning. The discrete spectrums indicated by squares, triangles and rhomboids have meanings. As described above, a waveform of the intake air amount is to be intrinsic to a cylinder operation state. Therefore, combination of spectrums which are obtained from Fourier transformation performed on the waveform at different cycles is to be intrinsic to the cylinder operation state.

In the state that cylinders are well-operated in the six-cylinder operation mode, the waveform of the intake air amount is almost a direct-current waveform as the waveform 51B as illustrated in FIG. 3C. Therefore, as illustrated in FIG. 6, values of all of the spectrums obtained from Fourier transformation at three cycles are to be close to zero.

"Failure 1" illustrated in a cylinder arrangement chart of FIG. 6 corresponds to one cylinder failure in the six-cylinder operation mode of FIG. 5A. In this example, the cylinder C3 is deactivated. In FIG. 1, the cylinders are illustrated by reference numerals C1 to C6. In FIG. 6, the character C is eliminated from the reference numerals. By performing Fourier transformation on the waveform 55B of FIG. 5A respectively at the cycles of 720 degrees, 360 degrees and 240 degrees, the spectrums illustrated in the graph above "failure 1" are obtained. The spectrum values at the cycles of 720 degrees and 360 degrees are the same and the spectrum value at the cycle of 240 degrees is small.

Next, "failure 2" illustrated in the cylinder arrangement chart of FIG. 6 corresponds to the state of FIG. 5C that two serial cylinders are deactivated due to an error occurring in the six-cylinder operation mode. The spectrums obtained by performing Fourier transformation on the waveform 55F of FIG. 5C at the three cycles are illustrated in the graph above "failure 2" of FIG. 6. The spectrum value at the cycle of 720 degrees is large, the spectrum value at the cycle of 360 degrees is medium and the spectrum value at the cycle of 240 degrees is almost zero.

"Failure 3" illustrated in the cylinder arrangement chart of FIG. 6 corresponds to the failure that three cylinders 1, 2, 4 are deactivated. In the three-cylinder operation mode of the engine of the present embodiment, the first bank is deactivated. This mode is illustrated as "normal 2" in the cylinder arrangement chart. Even in the deactivation state of three cylinders as well, engine vibration is to be large in the state of "failure 3". The spectrums obtained by performing Fourier transformation on the waveform obtained from the air flow sensor in this state at the three cycles are illustrated in the graph above "failure 3". The spectrum value at the cycles of 720 degrees is the maximum, the spectrum value at the cycle of 360 degrees is almost zero and the spectrum value at the cycle of 240 degrees is small.

"Failure 4" in the cylinder arrangement chart of FIG. 6 illustrates a state that two cylinders being different from those of "failure 2" are deactivated due to an error in the six-cylinder operation mode. In the four-cylinder operation mode of the present embodiment, the cylinder C3 of the first bank and the cylinder C4 of the second bank are deactivated. The operation states of "failure 2" and "failure 4" are not expected in this mode. Namely, "failure 2" and "failure 4" illustrate a state with some failure at the deactivation mechanism. In the state of "failure 4", the spectrum values obtained from Fourier transformation at the cycles of 720 degrees and 360 degrees are the same of a medium value and the spectrum value obtained from Fourier transformation at the cycle of 240 degrees is small.

"Normal 2" illustrated in the cylinder arrangement chart of FIG. 6 corresponds to the normal three-cylinder operation mode. Here, the spectrum values obtained by performing Fourier transformation on the waveform of the intake air amount respectively at the cycles of 720 degrees and 360 degrees are almost zero. Then, the spectrum value obtained from Fourier transformation at the cycle of 240 degrees is considerably large.

"Normal 3" illustrated at the right end in the cylinder arrangement chart of FIG. 6 corresponds to the normal four-cylinder operation mode of the present embodiment. Here, the spectrum values obtained by performing Fourier transformation on the waveform of the intake air amount respectively at the cycles of 720 degrees and 240 degrees are almost zero. Then, the spectrum value obtained from Fourier transformation at the cycle of 360 degrees is considerably large. Here, in a case that the spectrums corresponding to "the three cylinder mode" or "the four cylinder mode" are detected in spite of the fact that the instruction of cylinder deactivation is not generated, it is determined that failure occurs at three or two cylinders corresponding to the respective modes.

Next, a process to determine the cylinder deactivation with a computer program installed in the electronic control unit (ECU) will be described with reference to FIG. 7. First, the crank angle is calculated based on an output of a sensor for detecting the rotation angle of the crank shaft (101). This method has been utilized in the related art. Subsequently, the spectrums (i.e., magnitude) of discrete Fourier transformation are calculated by performing frequency analysis at the cycle of 720 degrees (102), frequency analysis at the cycle of 360 degrees (103) and frequency analysis at the cycle of 240 degrees (104). Description on discrete Fourier transformation will be supplemented later.

Threshold values are obtained by performing map search of 720 degree threshold values (106), map search of 360 degree threshold values (107) and map search of 240 degree threshold values (108). Referring to FIG. 6, in the present embodiment, the threshold value Th-720 for the spectrums at the cycle of 720 degrees is read from the memory. In addition, the value Th-720×K2 being Th-720 multiplied by a coefficient K2 (K2>1) and the value Th-720×K3 being Th-720 multiplied by a coefficient K3 (K3>K2) are utilized as the threshold values as illustrated in FIG. 6. Further, the threshold value Th-360 for the spectrums at the cycle of 360 degrees and the threshold value Th-240 for the spectrums at the cycle of 240 degrees are utilized. These threshold values are stored at the memory of the ECU as the maps capable of being searched by either or both of the intake air amount and the engine revolution speed.

Proceeding to step 110, the ECU determines which mode is operating among the six-cylinder operation mode, the four-cylinder operation mode and the three-cylinder operation mode. In a simple way, the determination is performed by referring setting flags of the operation modes. In the case of the six-cylinder operation mode, the process proceeds to FIG. 8. In the case of the three-cylinder operation mode, the process proceeds to step 124 and determines whether or not the Fourier transformation spectrum at the cycle of 720 degrees exceeds the threshold value Th-720.

Here, referring to FIG. 6 once again, in the normal three-cylinder operation mode, the cylinders of the first, the second and the third are deactivated as illustrated as "normal 2". Here, the spectrum values at the cycles of 720 degrees and 360 degrees are almost zero and the spectrum value at the cycle of 240 degrees is medium. In the case of being switched to the three cylinder operation from the six cylinder operation which is the default operation state, it is to be a deactivation state of two cylinders skipping one cylinder (i.e., the same state as "failure 4") or a deactivation state of one cylinder (i.e., the same state as "failure 1) when one cylinder or two cylinders remain at the operation state. In order to determine these states, the spectrums at the cycle of 720 degrees are utilized. Further, in the case of being switched to three cylinder operation from the four cylinder operation, the cylinders of the first, the fourth, the second and the third are deactivated so as to be a deactivation state of three serial cylinders when pin lock and the like occurs during the four cylinder operation. This state is similar to "failure 3" in FIG. 6 and can be determined by the spectrum at the cycle of 720 degrees.

Accordingly, when the spectrum at the cycle of 720 degrees is larger than the threshold value Th-720 in step 124, it is determined to be three cylinder operation failure (126). In this case, the process proceeds to step 127 of phase determination in order to determine the failed cylinder. Three patterns of deactivation failure, being the patterns of the first and the second cylinders, the second and the third cylinders, and the third and the first cylinders, can be considered as the error in this case. Here, the deactivation failure denotes the state of not being deactivated while receiving deactivation instruction. The failed cylinder can be determined by the later-mentioned phase determination 2 (127).

When the determination in step 124 is "NO", the process proceeds to step 125 and determines whether or not the spectrum through Fourier transformation at the cycle of 240 degrees exceeds the threshold value Th-240. When the determination is "YES", it is determined to be normal as the three-cylinder operation mode of "normal 2" in FIG. 6. In this case, the process can proceed to a failure determination process 129 of the hydraulic sensor. When the determination is "NO", it is determined that the bank deactivation is not performed appropriately (131). Then, all of the cylinders of the first, the second and the third are not deactivated appropriately (132).

In the case that the four-cylinder operation mode is instructed in step 110, the process proceeds to step 111 and determines whether or not the spectrum through Fourier transformation at the cycle of 720 degrees exceeds the threshold value Th-720. As indicated as "normal 3" at the right end in FIG. 6, in the normal state, the spectrum value at the cycle of 720 degrees is almost zero and the spectrum value at the cycle of 360 degrees is large. Accordingly, when the determination in step 111 is "YES", one cylinder is determined to be failed in deactivation (115). Then, the process proceeds to a phase determination process 116 in order to determine the failed cylinder.

When the determination in step 111 is "NO", the process proceeds to step 113 and determines whether or not the spectrum through Fourier transformation at the cycle of 360 degrees exceeds the threshold value Th-360. When the determination in step S113 is "YES", it is determined to be the normal four cylinder operation with two cylinder deactivation as illustrated at the right end in FIG. 6 (118). Then, the process can proceed to the determination process of the hydraulic sensor (119). When the determination in step 113 is "NO", it is determined to be failure (121). Then, it is determined that the fourth and the third cylinders are not deactivated properly (122).

Figure 8:
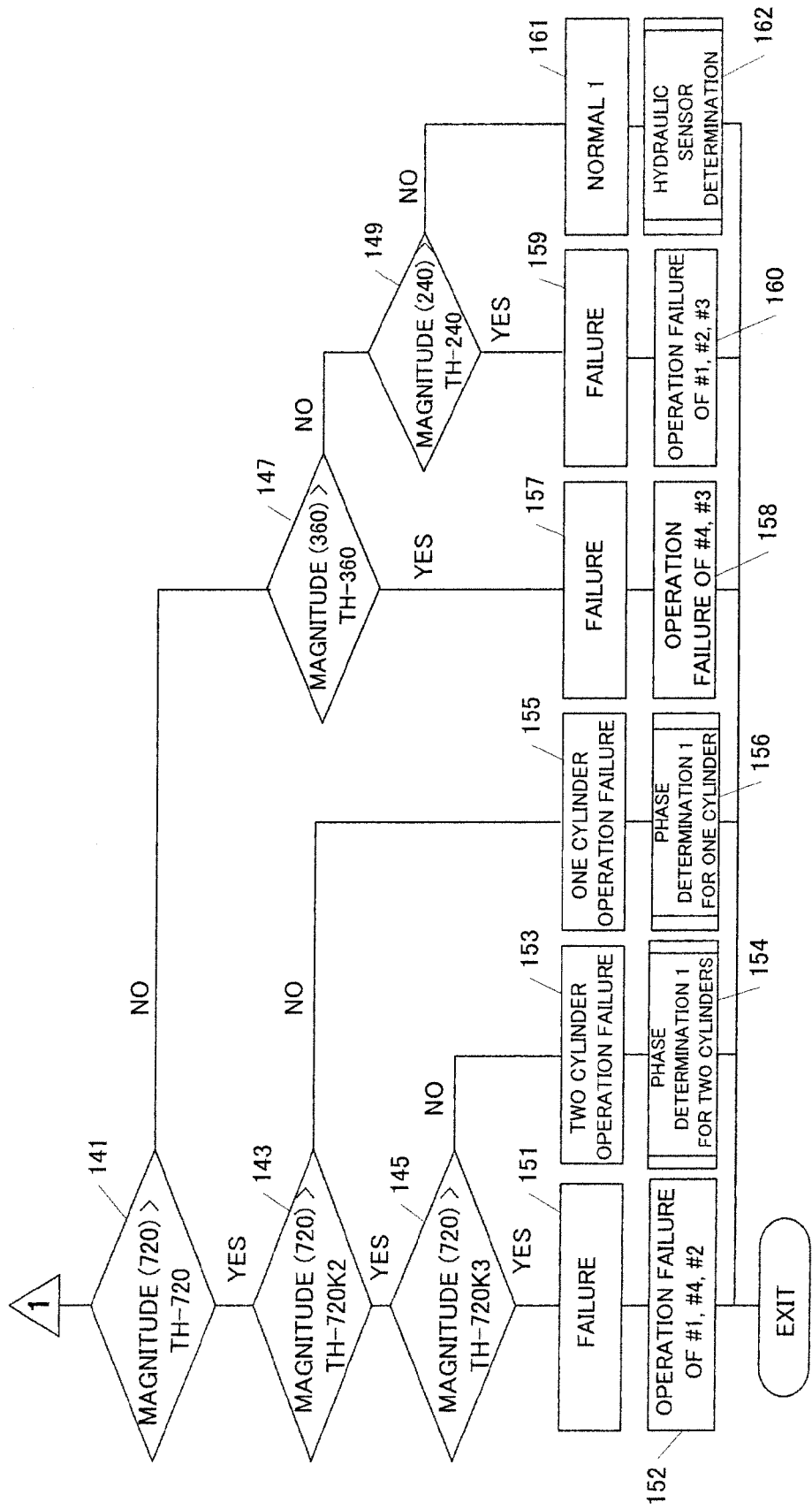
FIG. 8 is a flowchart subsequent to FIG. 7.

Next, a process to determine the operation state of the cylinders in the six-cylinder operation mode will be described with reference to FIG. 8. Referring to FIG. 6, the spectrum values at respective cycles of 720 degrees, 360 degrees and 240 degrees are almost zero in the normal six-cylinder operation mode of "normal 1". In step 141, it is determined whether or not the spectrum through Fourier transformation at the cycle of 720 degrees exceeds the threshold value Th-720. When the determination is "NO", the process proceeds to step 147 and determines whether or not the spectrum through Fourier transformation at the cycle of 360 degrees exceeds the threshold value Th-360. When the determination in step 147 is "YES", it is determined that the operation state is the four-cylinder operation mode in FIG. 6 and the fourth and the third cylinders are operationally failed (158).

When the determination in step 147 is "NO", the process proceeds to step 149 and determines whether or not the spectrum through Fourier transformation at the cycle of 240 degrees exceeds the threshold value Th-240. When the determination is "YES" in step 149, it is determined that the operation state is the three-cylinder operation mode in FIG. 6 and the cylinders of the first, the second and the third are operationally failed (160). When the determination in step 149 is "NO", it is determined to be normal (161) since the operation state corresponds to the six-cylinder operation mode at the left end in FIG. 6. Then, the process can proceed to the determination process of the hydraulic sensor.

When the determination in step 141 is "YES", the process proceeds to step 143 and determines whether or not the spectrum through Fourier transformation at the cycle 720 degrees exceeds the threshold value Th-720×K2. When the determination in step 143 is "NO", it is determined to be the operation failure of one cylinder (155). Then, the process proceeds to a phase determination process 156 for one cylinder.

When the determination in step 143 is "YES", the process proceeds to step 145 and determines whether or not the spectrum through Fourier transformation at the cycle of 720 degrees exceeds the threshold value Th-720×K3. When the determination in step 145 is "NO", it is determined to be the operation failure of two cylinders (153). Then, the process proceeds to a phase determination process 154 for two cylinders. When the determination in step 145 is "YES", the operation state is "failure 3" in FIG. 6. Accordingly, it is determined that the cylinders of the first, the fourth and the second are operationally failed (152).

Next, discrete Fourier transformation performed in the subroutines 102, 103, 104 of FIG. 7 will be described with reference to FIG. 9. Following is brief description of complex type Fourier transformation. Cycle waves f(t)=f(t−T) as T being the cycle are expressed by the following equation.

$$f(t) = \sum_{n=0}^{\infty} Kn\cos(n\omega_0 t - \theta_n) = \sum_{n=-\infty}^{\infty} c_n e^{jn\omega_0 t} \text{ as } \omega_0 = 2\pi/T$$

$c_n$ is complex type Fourier coefficient and expressed by the following equation.

$$c_n = \frac{1}{T}\int_{-\frac{T}{2}}^{\frac{T}{2}} f(t)e^{-j\omega_0 t} dt$$

The spectrum (i.e., the amplitude and intensity) $K_n$ and the phase $\theta_n$ of a sine wave of the cycle T are obtained by the following equation. Here, RE denotes the real number part and IM denotes the imaginary number part.

$$K_n = \sqrt{(2\text{RE}c_n)^2 + (2\text{IM}c_n)^2}$$

$$\theta_n = \tan^{-1}\frac{\text{IM}c_n}{\text{RE}c_n}$$

Figure 9:
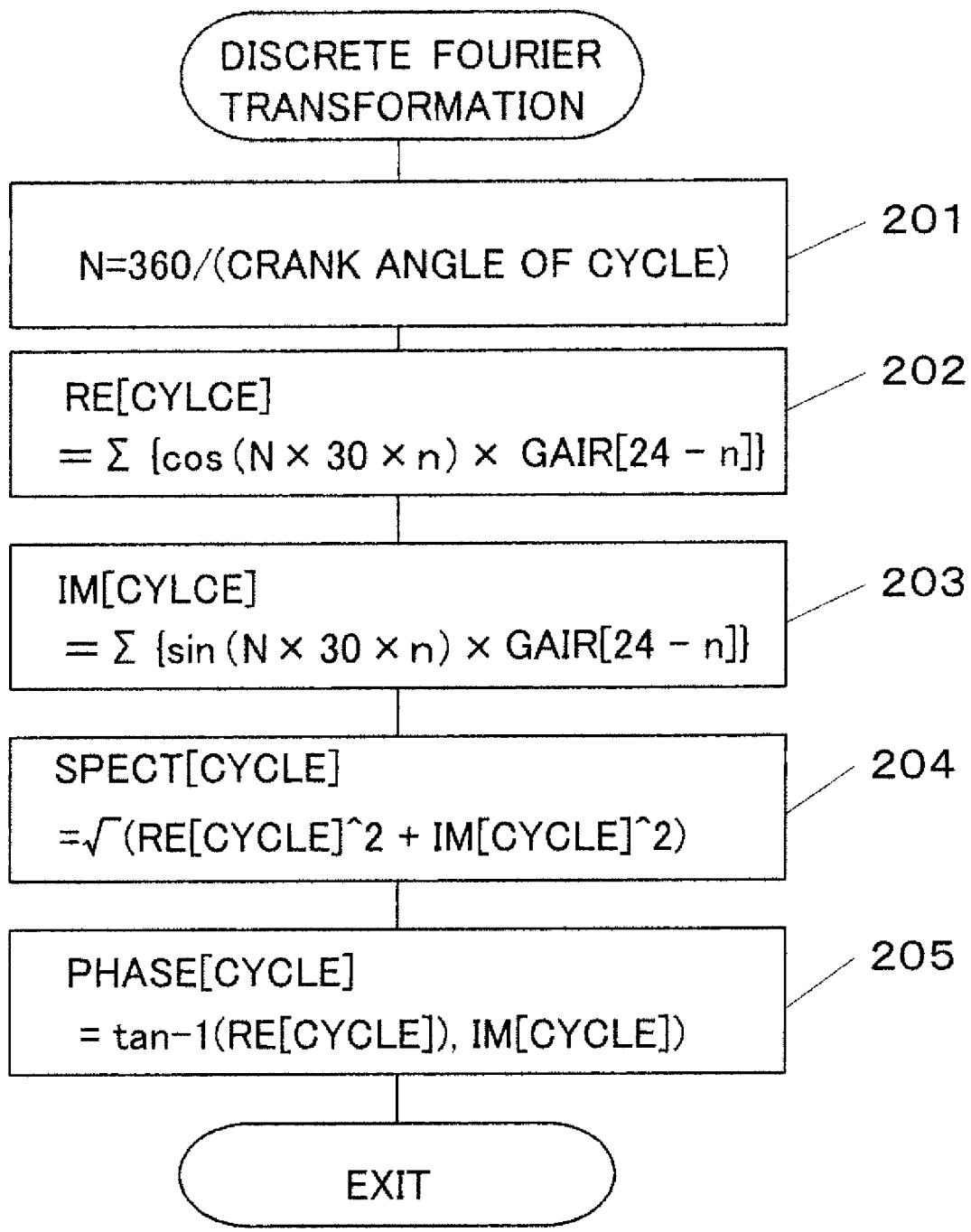
FIG. 9 is a view which describes a process of discrete Fourier transformation.

FIG. 9 describes a process to obtain the spectrum SPECT (i.e., $K_n$) and the phase PHASE (i.e., $\theta_n$) in the present embodiment. Here, the crank angles of 720 degrees, 360 degrees and 240 degrees are objective cycles for Fourier transformation. In step 201, ratios N of the objective cycles against 360 degrees (i.e., $2\pi$) are obtained. The ratios N are 0.5 for the cycle of 720 degrees, 1.0 for the cycle of 360 degrees and 1.5 for the cycle of 240 degrees.

In step 202, the real number parts $\text{RE}c_n$ of Fourier series $c_n$ are obtained for the three ratios N. Then, in step 203, the imaginary number parts $\text{IM}c_n$ are obtained for the three ratios N. In the equation expressed in each step, numeral 30 means 30 degrees of the sampling cycle. GAIR[ ] expresses objective array data for discrete Fourier transformation. In this example, discrete Fourier transformation is performed by utilizing twenty-four sample values (i.e., discrete values) contained in one cylinder cycle (i.e., 720 degrees).

Subsequently, the spectrums $K_n$ are calculated in step 204 and the phases $θ_n$ are calculated in step 205. The intensity (720), the intensity (360) and the intensity (240) used in FIG. 8 are spectrums $K_n$ obtained from Fourier transformation respectively at the cycles of 720 degrees, 360 degrees and 240 degrees.

Figure 10:
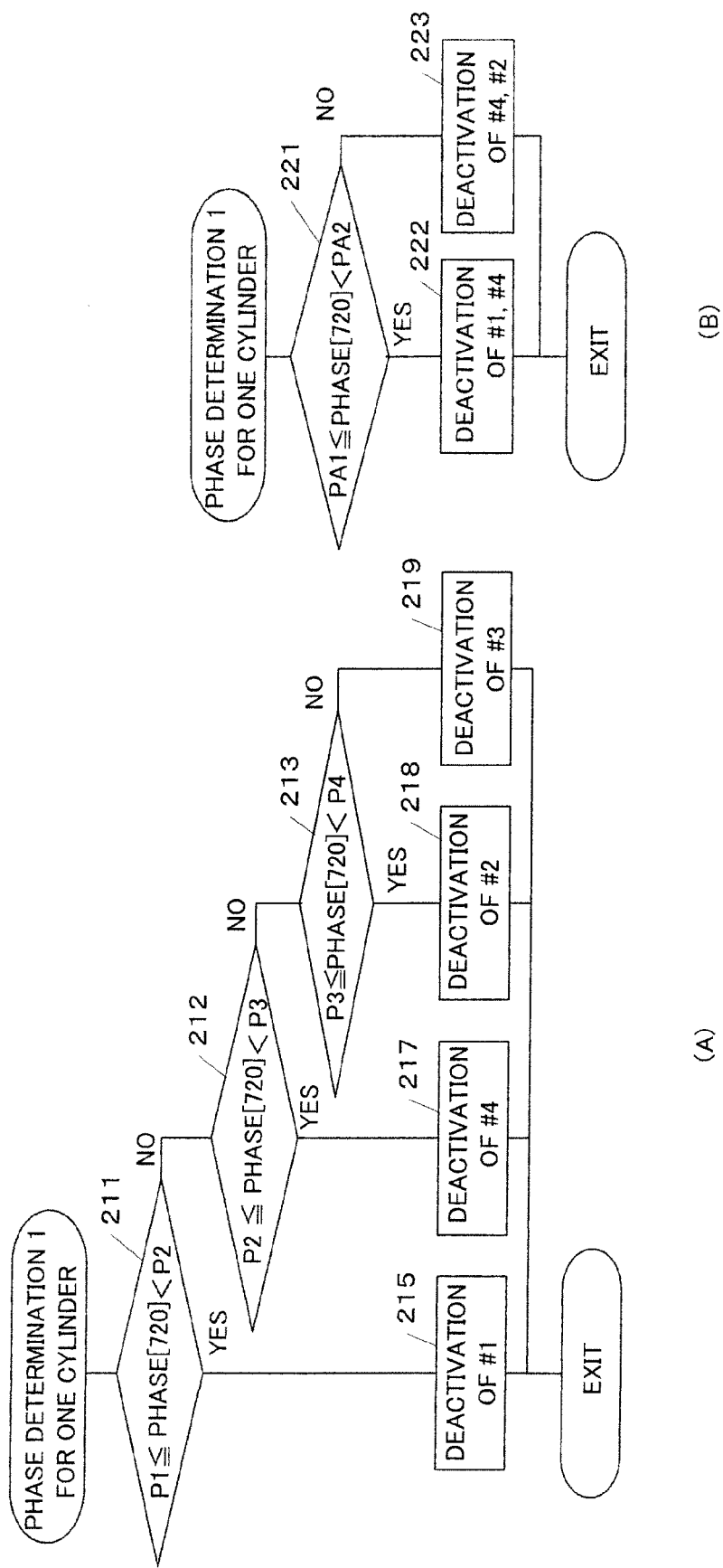
FIGS. 10A and 10B are flowcharts which describe a process to determine a deactivated cylinder with a phase obtained from Fourier transformation.

Next, the process of phase determination for one cylinder of step 156 in FIG. 8 will be described with reference to FIG. 10A. As illustrated in FIG. 6, "failure 1" is the failure that one cylinder is deactivated in the six-cylinder operation mode. Here, it cannot be determined which cylinder is deactivated by the spectrum intensity. When one cylinder among six cylinders is deactivated, distortion occurs at the waveform of the intake air amount as illustrated in FIG. 5A. The phase of the distortion occurred at the waveform corresponds to the deactivated cylinder. Since only cylinders of the first, the fourth, the second and the third respectively have the deactivation mechanism, threshold values P1, P2, P3, P4 to determine the phases corresponding to the respective four cylinders are prepared. It is determined in steps 211, 212, 213 where the phase PHASE[720] obtained from Fourier transformation at the cycle of 720 degrees corresponding to the six cylinder operation is positioned. Then, in accordance with the determination, it is determined to be the deactivation of the first cylinder (215), the deactivation of the fourth cylinder (217), the deactivation of the second cylinder (218) or the deactivation of the third cylinder (219).

Next, a process of phase determination for two cylinder deactivation failure in the six-cylinder operation mode of step 154 in FIG. 8 will be described with reference to FIG. 10B. When two serial cylinders are deactivated in the six-cylinder operation mode, the waveform of the intake air amount is distorted as illustrated in FIG. 5C. The phase of the distortion corresponds to the two deactivated serial cylinders. Since the cylinders having the deactivation mechanism are four cylinders of the first, the fourth, the second and the third and the cylinders are operated in the order of 1-4-2-5-3-6-1, the serial cylinders are 1-4 and 4-2 among the four cylinders having the deactivation mechanism. Accordingly, the phase when the first and the fourth cylinders are deactivated and the phase when the fourth and the second cylinders are deactivated are predetermined, and then, the threshold values PA1, PA2 to distinguish the two cases are previously set. When the phase PHASE [720] obtained by performing Fourier transformation on the waveform of the intake air amount at the cycle of 720 degrees corresponding to the six-cylinder operation mode is positioned between these threshold values (221), it is determined that the first and the fourth cylinders are deactivated (222). When the phase is not positioned between these threshold values, it is determined that the fourth and the second cylinders are deactivated (223).

Figure 7:
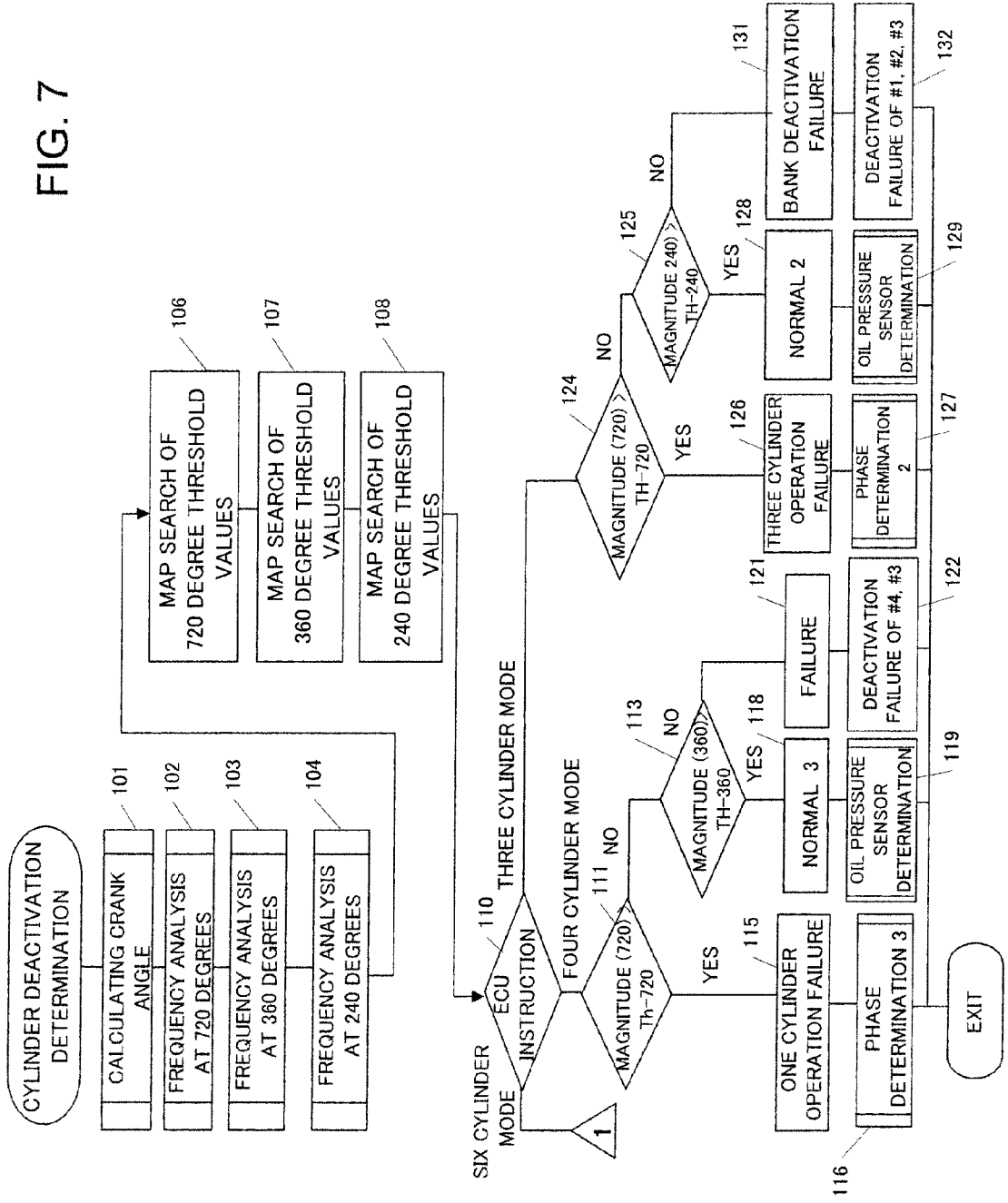
FIG. 7 is a flowchart which describes a process to determine cylinder deactivation.
Figure 11:
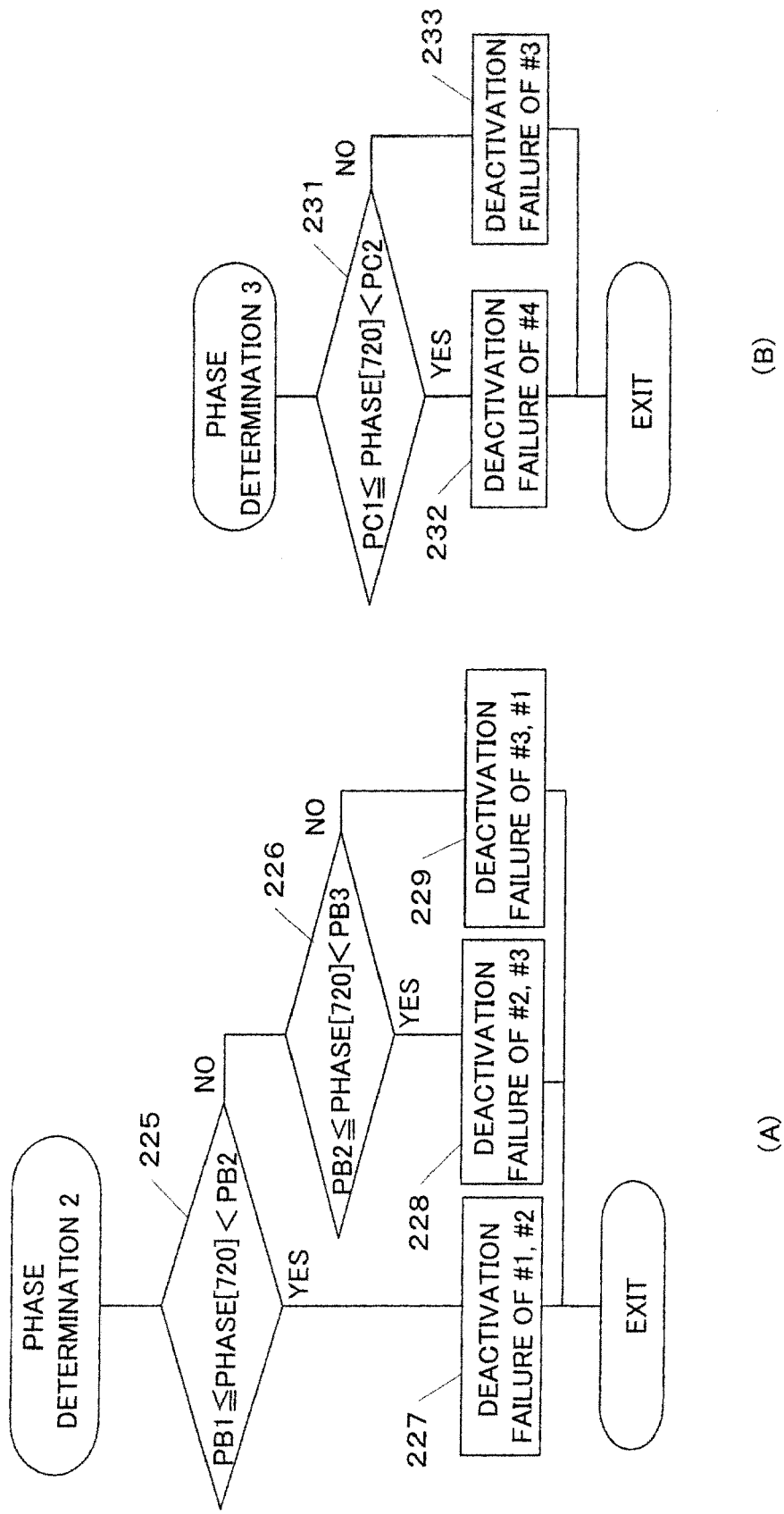
FIGS. 11A and 11B are flowcharts which describe a process to determine a deactivated cylinder with a phase obtained from Fourier transformation.

Next, FIG. 11A describes a process to determine two cylinders of deactivation failure in the state of being determined as the three cylinder operation failure (126) in the three-cylinder operation mode of FIG. 7. Here, four cylinders of the first, the second, the third and the fourth respectively have the deactivation mechanism. Then, in the normal three cylinder deactivation, three cylinders of the first, the second and the third are deactivated. Accordingly, as the failure of two deactivation mechanisms, there are three cases of deactivation failure of the first and the second cylinders illustrated as "failure 1" in FIG. 6 (227), deactivation failure of the second and the third cylinders illustrated as "failure 2" in FIG. 6 (228), and deactivation failure of the third and the first cylinders (229). This determination is performed based on the phase obtained from Fourier transformation at the cycle of 720 degrees. The phases are experimentally obtained from Fourier transformation at the cycle of 720 degrees for the abovementioned three cases. Then, threshold values PB1, PB2, PB3 are prepared to distinguish the phases. When the phase is positioned between the threshold values PB1, PB2 (225), it is determined that the first and the second cylinders are in the deactivation failure (227). When the determination in step 225 is "NO", the process proceeds to step 226. Then, when the phase is positioned between the threshold values PB2, PB3 (228), it is determine that the second and the third cylinders are in the deactivation failure (228). When the determination in step 226 is "NO", it is determined that the third and the first cylinders are in the deactivation failure (229).

FIG. 11B describes the phase determination process when the spectrum at the cycle of 720 degrees is larger than the threshold value Th-720 in the four-cylinder operation mode in FIG. 7 to be determined as one cylinder deactivation failure (115). In the normal four-cylinder operation mode, the third and the fourth cylinders are deactivated. The one cylinder deactivation failure is the failure that one cylinder thereof is not deactivated. The cylinder determination of the deactivation failure is performed based on the phase obtained from Fourier transformation at the cycle of 720 degrees. Threshold values PC1, PC2 for the determination are previously set by experiment. When the phase is positioned between the threshold values PC1, PC2 (231), it is determined that the fourth cylinder is failed in deactivation (232). When the determination in step 231 is "NO", it is determined that the third cylinder is failed in deactivation (233).

Figure 12:
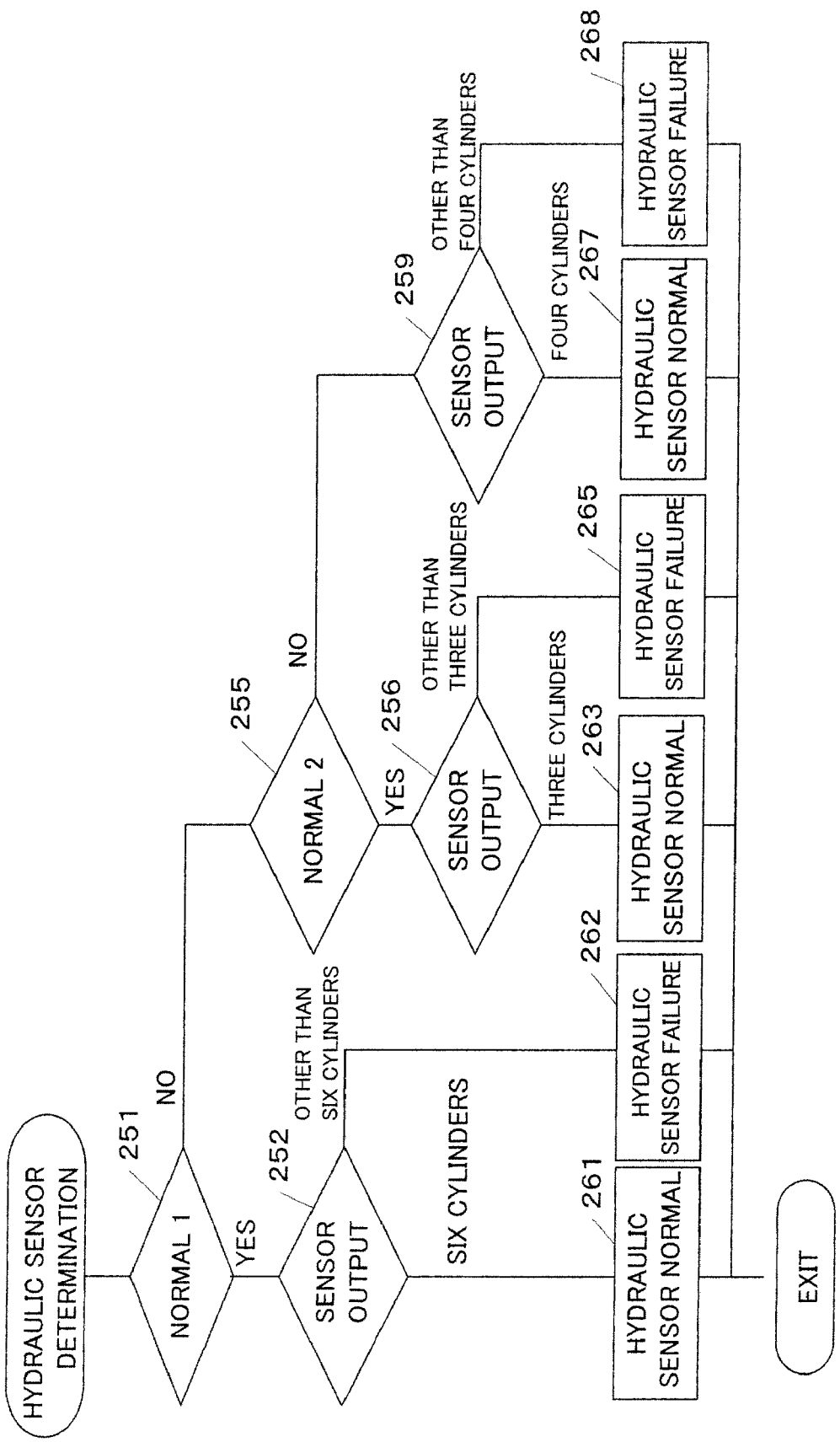
FIG. 12 is a flowchart which describes a process to determine failure of a hydraulic sensor.

FIG. 12 describes the failure determination process of the hydraulic sensor. While the cylinder deactivation state is determined to be normal, it is determined whether or not the hydraulic sensor indicates an appropriate value corresponding to the operation mode. When the appropriate value is not indicated, it is determined that the hydraulic sensor is failed. In step 181 of FIG. 8, when it is determined that the normal six cylinder operation is performed (251), it is determined whether or not the output of the hydraulic sensor is in a state expected for the six-cylinder operation mode (252). In the case of corresponding to the six-cylinder operation mode, the hydraulic sensor is determined to be normal (261). Otherwise, it is determined that the hydraulic sensor is failed (262).

In the case of determination of being normal three-cylinder operation mode in step 128 of FIG. 7 (255), it is determined whether or not the output of the hydraulic sensor is in a state expected for the three-cylinder operation mode (256). In the case of corresponding to the three-cylinder operation mode, the hydraulic sensor is determined to be normal (263). Otherwise, it is determined that the hydraulic sensor is failed (265).

In the case that the determination of both steps 251, 255 is "NO", the process proceeds to step 259. Then, it is determined whether or not the output of the hydraulic sensor is in a state expected for the four-cylinder operation mode (259). In the case of corresponding to the four-cylinder operation mode, the hydraulic sensor is determined to be normal (267). Otherwise, it is determined that the hydraulic sensor is failed (268).

In the above, specific embodiments of the present invention are described. However, the present invention is not limited to these embodiments.

What is claimed is:

1. An apparatus adapted to determine a cylinder deactivation state of an internal combustion engine configured to deactivate one or more cylinders among a plurality of cylinders in accordance with an instruction from a program-controlled electronic control unit, said apparatus comprising:

detection means for producing a signal representing intake air amount into the internal combustion engine;

the electronic control unit comprising

Fourier transformation means configured to perform Fourier transformation on the signal from the detection means relative to a plurality of fundamental frequencies, wherein the plurality of fundamental frequencies includes a first fundamental frequency corresponding to 720 degrees of crank angle, a second fundamental frequency corresponding to 360 degrees of crank angle, and a third fundamental frequency corresponding to 240 degrees of crank angle; and threshold value supply means for providing a threshold value for determining cylinder deactivation state in accordance with a predetermined relationship between each spectrum obtained from the Fourier transformation means at each of the plurality of fundamental frequencies and the cylinder deactivation state of the internal combustion engine, and determining deactivation state of the cylinder based on whether or not each of the spectrums obtained from the Fourier transformation exceeds a corresponding threshold value.

2. The apparatus according to claim 1, wherein the threshold value is provided in accordance with revolution speed and/or load of the internal combustion engine.

3. The apparatus according to claim 2, wherein a deactivated cylinder is identified based on phase information obtained from the Fourier transformation.

4. The apparatus according to claim 1, wherein the electronic control unit determines whether the determined cylinder deactivation state matches with the instruction, and when the determination is normal, performing failure determination of a hydraulic sensor provided in a hydraulic circuit for hydraulically actuating a cylinder deactivation mechanism.

5. A method for determining a cylinder deactivation state of an internal combustion engine configured to deactivate one or more cylinders among a plurality of cylinders in accordance with an instruction from a program-controlled electronic control unit, said method comprising:

producing with a sensor a signal representing intake air flow into the internal combustion engine;

performing by the electronic control unit Fourier transformation of the signal from the sensor relative to a plurality of fundamental frequencies, wherein the plurality of fundamental frequencies includes a first fundamental frequency corresponding to 720 degrees of crank angle, a second fundamental frequency corresponding to 360 degrees of crank angle, and a third fundamental frequency corresponding to 240 degrees of crank angle;

providing a threshold value for determining the cylinder deactivation state in accordance with a predetermined relationship between each spectrum obtained from the Fourier transformation means at each of the plurality of fundamental frequencies and the cylinder deactivation state of the internal combustion engine; and determining deactivation state of the cylinder based on whether or not each of the spectrums obtained from the Fourier transformation exceeds a corresponding threshold value.

6. The method according to claim 5, wherein the threshold value is provided in accordance with revolution speed and/or load of the internal combustion engine.

7. The method according to claim 6, further comprising: identifying a deactivated cylinder based on phase information obtained from the Fourier transformation.

8. The method according to claim 5, further comprising: determining whether the determined cylinder deactivation state matches with the instruction, and when the determination is normal, performing failure determination of one or more hydraulic sensors provided in a hydraulic circuit for hydraulically actuating a cylinder deactivation mechanism.

9. A computer program to run on a computer to perform the function of determining a cylinder deactivation state of an internal combustion engine configured to deactivate one or more cylinders among a plurality of cylinders in accordance with an instruction from a program-controlled electronic control unit, said program when run on a computer configured to:

produce with a sensor a signal representing intake air flow into the internal combustion engine, perform Fourier transformation of the signal from the sensor relative to a plurality of fundamental frequencies, wherein the plurality of fundamental frequencies includes a first fundamental frequency corresponding to 720 degrees of crank angle, a second fundamental frequency corresponding to 360 degrees of crank angle, and a third fundamental frequency corresponding to 240 degrees of crank angle, provide a threshold value for determining the cylinder deactivation state in accordance with a predetermined relationship between each spectrum obtained from the Fourier transformation means at each of the plurality of fundamental frequencies and the cylinder deactivation state of the internal combustion engine, and determine deactivation state of the cylinder based on whether or not each of the spectrums obtained from the Fourier transformation exceeds a corresponding threshold value.

10. The program according to claim 9, wherein the threshold value is provided in accordance with revolution speed and/or load of the internal combustion engine.

11. The program according to claim 10, further configured to:

identify a deactivated cylinder based on phase information obtained from the Fourier transformation.

12. The program according to claim 9, further configured to:

determine whether the determined cylinder deactivation state matches with the instruction, and when the determination is normal, perform failure determination of one or more hydraulic sensors provided in a hydraulic circuit for hydraulically actuating a cylinder deactivation mechanism.

* * * * *